(12) United States Patent
Ono et al.

(10) Patent No.: US 8,891,026 B2
(45) Date of Patent: Nov. 18, 2014

(54) PROJECTION VIDEO DISPLAY DEVICE

(75) Inventors: Chohei Ono, Ibaraki (JP); Shinro Inui, Ibaraki (JP); Masayuki Fukui, Ibaraki (JP); Kazuomi Kaneko, Hitachi (JP); Nobuki Matsui, Hitachi (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 14/350,514

(22) PCT Filed: Oct. 13, 2011

(86) PCT No.: PCT/JP2011/073592
§ 371 (c)(1),
(2), (4) Date: Apr. 8, 2014

(87) PCT Pub. No.: WO2013/054426
PCT Pub. Date: Apr. 18, 2013

(65) Prior Publication Data
US 2014/0253818 A1    Sep. 11, 2014

(51) Int. Cl.
*H04N 3/223* (2006.01)
*H04N 3/227* (2006.01)
*H04N 5/74* (2006.01)

(52) U.S. Cl.
CPC .................................. *H04N 5/7416* (2013.01)
USPC .............. 348/747; 348/745; 359/814; 353/70

(58) Field of Classification Search
USPC .......... 348/744–747; 359/813, 814, 919–826; 353/70, 100–101
See application file for complete search history.

(56) References Cited

U.S. PATENT DOCUMENTS

| 6,501,710 | B2* | 12/2002 | Yokoyama et al. | 369/44.14 |
| 6,966,657 | B2* | 11/2005 | Van De Velde et al. | 353/101 |
| 8,186,835 | B2* | 5/2012 | Furui | 353/70 |
| 2004/0080836 | A1 | 4/2004 | Miyashita et al. | |
| 2005/0117127 | A1 | 6/2005 | Jang | |
| 2005/0231831 | A1* | 10/2005 | Araki | 359/823 |
| 2006/0285089 | A1* | 12/2006 | Higashi | 353/101 |
| 2007/0133109 | A1 | 6/2007 | Kuroki et al. | |

FOREIGN PATENT DOCUMENTS

| JP | 2001-154265 A | 6/2001 |
| JP | 2002-323648 A | 11/2002 |

(Continued)

OTHER PUBLICATIONS

International Search Report, w/ English translation thereof, issued in International Application No. PCT/JP2011/073592 dated Nov. 8, 2011.

*Primary Examiner* — Michael Lee
(74) *Attorney, Agent, or Firm* — McDermott Will & Emery

(57) ABSTRACT

Provided is a projection video display device with which a sliding load is minimized while maintaining an adjustment precision in a lens shift mechanism. A lens shift mechanism (32) which moves a projection lens in a direction which is orthogonal to the optical axis of projected light has a configuration in which mobile bases (50, 60), which retain the projection lens, slide using a shaft (52), which is attached on a fixed member (4) side, as a guide member. A further aspect of the configuration is that a correction screw is inserted from the rear face side of the fixed member (4) to make contact with the shaft (52), and optical axis tilt and misalignment of the projection lens are corrected by adjusting the degree of insertion of the correction screw.

3 Claims, 7 Drawing Sheets

(56) References Cited

FOREIGN PATENT DOCUMENTS

| JP | 2003-315917 A | 11/2003 |
| JP | 2005-062434 A | 3/2005 |
| JP | 2005-157370 A | 6/2005 |
| JP | 2007-033591 A | 2/2007 |
| JP | 2007-163652 A | 6/2007 |
| JP | 2007-256318 A | 10/2007 |
| JP | 2010-256388 A | 11/2010 |

* cited by examiner

Projection optical system 3

(a) Exploded view of projection optical system 3

(b) Rear view of projection lens 31

(a) Y-axis actuator 51

(b) X-axis actuator 62

(a) Movable base is tilted (b) No tilt (c) Tilted

PROJECTION VIDEO DISPLAY DEVICE

RELATED APPLICATIONS

This application is the U.S. National Phase under 35 U.S.C. §371 of International Application No. PCT/JP2011/073592, filed on Oct. 13, 2011, the disclosures of which Application is incorporated by reference herein.

TECHNICAL FIELD

The present invention relates to a projection video display device.

BACKGROUND ART

Projection video display devices such as a liquid crystal projector irradiate a display element such as a liquid crystal panel with light emitted from a light source such as a mercury lamp, and enlarges and projects a video formed by the display element with a projection lens onto a screen. The configuration of an optical system of the device includes an optical unit from irradiation with light emitted from the light source on the liquid crystal panel to formation of the video (hereinafter, referred to as an optical engine) and a projection optical system which enlarges and projects the video formed by the liquid crystal panel with a projection lens. In an optical engine of a color video display device, three liquid crystal panels for three primary colors (RGB) as display elements, a color separation system for irradiation light, and a color synthesis system for respective video colors are provided. Moreover, for adjusting a video-displaying position on the screen, a lens shifting mechanism which can move a projection lens in a direction perpendicular to an optical axis is provided in the projection optical system.

The lens shifting mechanism is arranged to move the projection lens in two directions perpendicular to the optical axis of projection light, i.e., a horizontal direction and a vertical direction, and is required to be reduced in size and have high accuracy. In Patent Literature 1, a structure is proposed which aims to downsize the lens shifting mechanism and improve the operability thereof and includes a manual operating portion, which is provided with an arrangement of operating knobs for horizontal direction and vertical direction, and a movement transmission mechanism portion for cutting off a transmitted force at a lens-shift-limit position by means of a clutch mechanism portion.

CITATION LIST

Patent Literature

PTL 1: Japanese Patent Application Laid-Open No. 2010-256388

SUMMARY OF INVENTION

Technical Problem

Conventional lens shifting mechanisms, including the one in Patent Literature 1, incorporate two movable bases for moving a projection lens in two axial directions. Portions between the movable bases and stationary members for supporting them and between the two movable bases are configured to allow opposed contact surfaces to slide (surface sliding). In this case, for preventing a positional displacement between both, the portions are configured such that a pressure contact force of a predetermined magnitude or more is applied to the contact surfaces by means of a spring or the like. Thus, when the movable base is moved, a friction is generated, so that a sliding load is large and smooth adjustment of a lens position is difficult. On the other hand, when the pressure contact force is weakened for reducing the sliding load, positioning of the movable base is not stable, thus degrading the accuracy of lens position adjustment. In this way, it has been difficult to simultaneously achieve reduction in sliding load when the lens is moved and improvement of adjustment accuracy. In addition, correction of tilt of the optical axis of the projection lens or the like is required as another function of the lens shifting mechanism. In that case, it is difficult to incorporate a tilt correction function in the structure in which the movable base is made to surface-slide, and an optical axis correction function has to be provided separately, thus making the device larger.

It is an object of the present invention to provide a projection video display device which can reduce a sliding load with maintaining adjustment accuracy in a lens shifting mechanism.

Solution to Problem

According to the present invention, in a projection video display device which enlarges and projects a video formed by a display element with a projection lens, a lens shifting mechanism is provided which moves the projection lens in a direction perpendicular to an optical axis of projection light, and is configured to make a movable base for holding the projection lens slide by using shafts attached on a fixed member side as guide members.

Moreover, it is configured that correction screws are inserted toward the shafts which guide the movable base from a rear side of the fixed member to come into contact with the shafts, and insertion amounts of the correction screws are adjusted, thereby tilt of an optical axis of the projection lens and a position displacement of the projection lens are corrected.

Advantageous Effects of Invention

According to the present invention, it is possible to provide a projection video display device which can reduce a sliding load with maintaining adjustment accuracy in a lens shifting mechanism.

DESCRIPTION OF EMBODIMENTS

Figure 1:
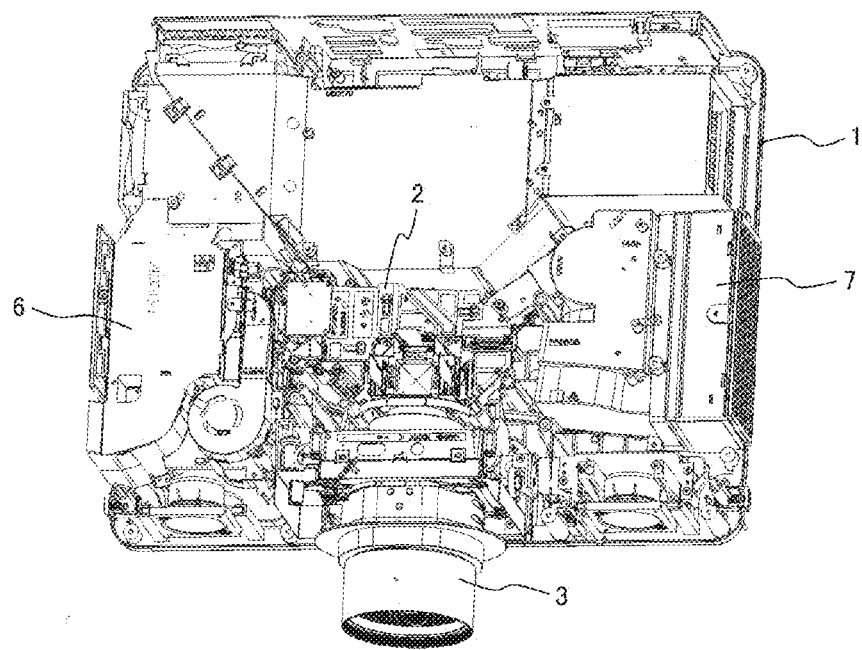
FIG. 1 is a diagram showing an entire structure of a projection video display device according to this example.

An embodiment of the present invention will be described below, referring to the drawings.

FIG. 1 is a diagram showing the entire structure of a projection video display device of this example, and shows an internal structure of the display device. In a case 1, an optical engine 2, which emits light from a light source and radiates the light onto a liquid crystal panel as a display element to form a video, and a projection optical system 3, which enlarges and projects the video formed by the liquid crystal panel with a projection lens, are accommodated as an optical system. In addition to those, a power supply unit 6 and a cooling unit 7, and a video signal circuit, a control circuit, and the like which are not shown are also accommodated.

Figure 2:
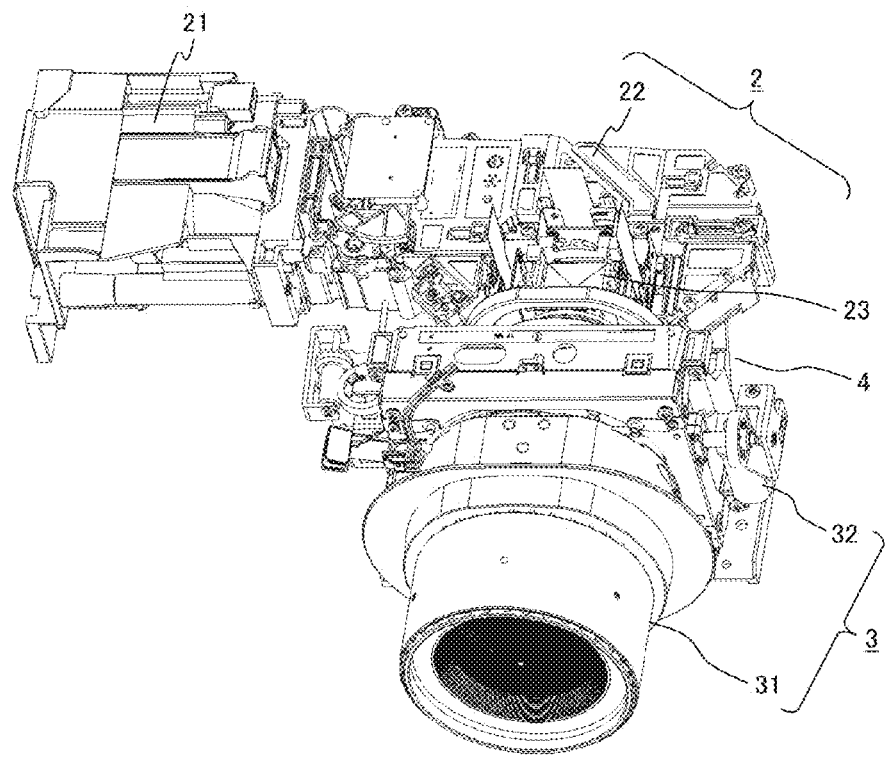
FIG. 2 is a diagram showing an entire structure of an optical system.

FIG. 2 is a diagram showing the entire structure of the optical system. The optical system includes the optical engine 2 and the projection optical system 3 which both are fixed to a common base 4 and are attached to the case 1.

The optical engine 2 is formed by a light source portion 21, a color separation optical system 22, and a color synthesis optical system 23. A light source such as an ultra-high pressure mercury lamp is used in the light source portion 21, and emits approximately white light. The color separation optical system 22 separates the approximately white light into light of RGB three primary colors and guides the light of three primary colors to respective liquid crystal panels corresponding thereto. The color synthesis optical system 23 includes R, G, and B liquid crystal panels and a cross dichroic prism, and forms respective videos based on R, G, and B signals and performs color synthesis for those videos.

The projection optical system 3 is formed by a projection lens 31 and a lens shifting mechanism 32. Video light emitted from the color synthesis optical system 23 is enlarged and projected onto a screen or the like by the projection lens 31. The lens shifting mechanism 32 holds the projection lens 31 and moves it in two axial directions perpendicular to an optical axis (projection direction), i.e., a horizontal direction and a vertical direction. Thus, a position of an image projected onto the screen can be moved and adjusted in the horizontal direction and the vertical direction.

Figure 3:
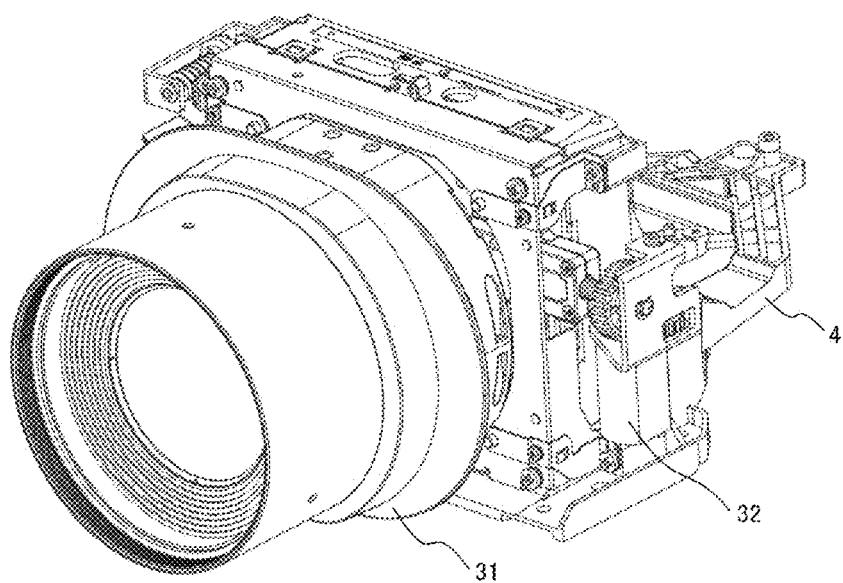
FIG. 3 is an entire view of a projection optical system 3.
Figure 4:
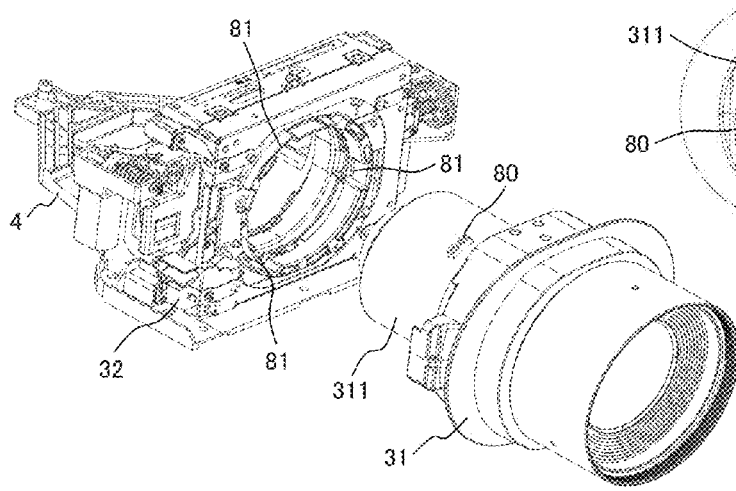
FIG. 4 is an exploded view of the projection optical system 3.
Figure 4:
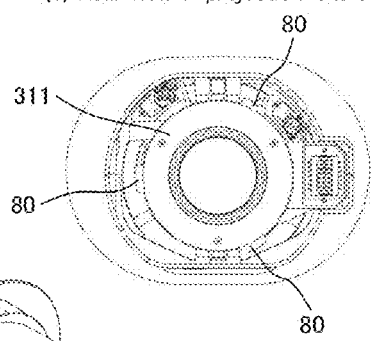

FIG. 3 and FIG. 4 show the projection optical system 3 and an exploded view thereof. FIG. 3 is the entire view of the projection optical system 3, and FIG. 4 is a view when the projection optical system 3 is exploded into the projection lens 31 and the lens shifting mechanism 32. The lens shifting mechanism 32 is held by the common base 4 and performs a lens shifting operation.

As shown in FIG. 4(a), a lens barrel 311 of the projection lens 31 is provided with a flange (projection) 80. By engagement of this flange 80 with a convex portion 81 provided in the lens shifting mechanism 32, the projection lens 31 is attached. FIG. 4(b) is a rear view of the projection lens 31. The projection lens 31 has three flanges 80, for example, provided on the periphery of the lens barrel 311. Similarly, three convex portions 81 are provided in the lens shifting mechanism 32.

Figure 5:
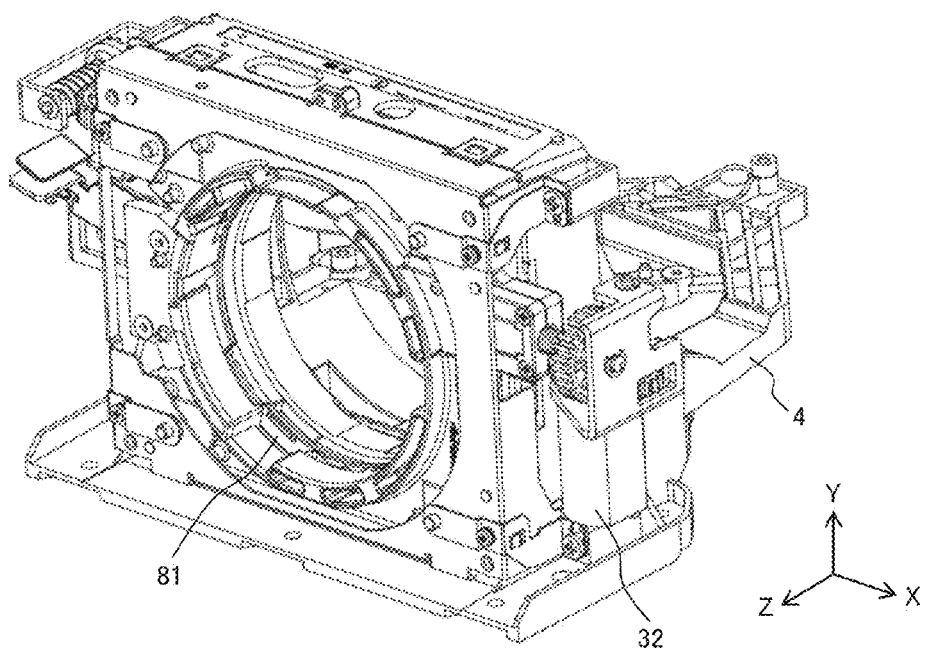
FIG. 5 is an entire view of a lens shifting mechanism 32.
Figure 6:
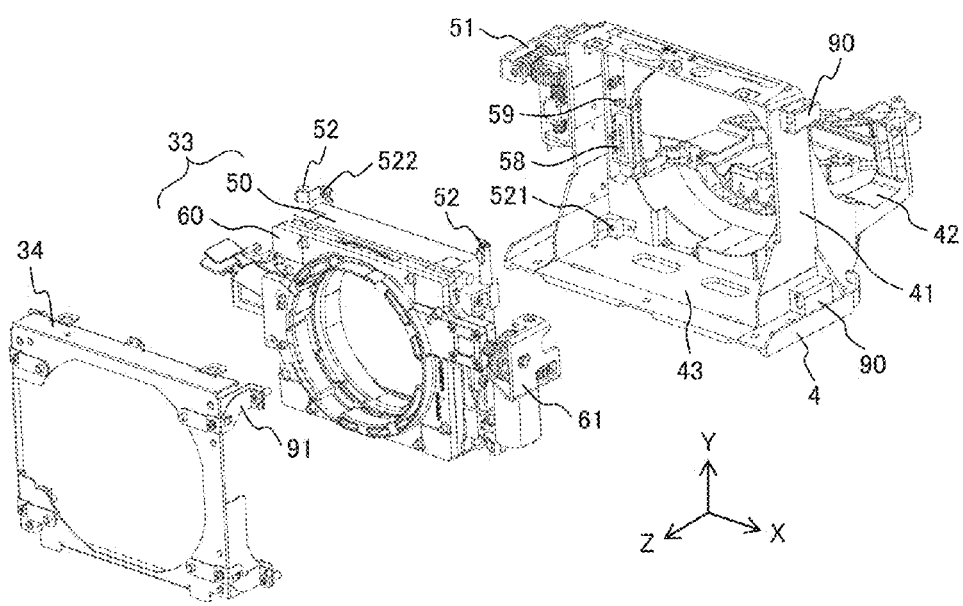
FIG. 6 is an exploded view of the lens shifting mechanism 32.

FIG. 5 and FIG. 6 show the lens shifting mechanism 32 and an exploded view thereof. FIG. 5 is the entire view of the lens shifting mechanism 32, and FIG. 6 shows a state in which the lens shifting mechanism 32 is exploded into the common base 4, the movable base assembly 33, and a base cover 34. In the following description, a direction of an optical axis of projection light is referred to as Z direction, and the horizontal direction and the vertical direction which are perpendicular thereto are referred to as X direction and Y direction, respectively.

The common base 4 includes a fixing frame 41 standing in a central portion and pedestal portions 42 and 43 on both sides thereof. The movable base assembly 33 is mounted on one of the pedestal portion 43 and is fixed to the fixing frame 41. On the other pedestal portion 42, the optical engine 2 is mounted.

The movable base assembly 33 is a member which can move in X direction and Y direction while holding the projection lens 31, and is configured by a Y-axis movable base (hereinafter, referred to as a Y base) 50 which is arranged on the common base 4 side and can move in Y direction and an X-axis movable base (hereinafter, referred to as an X base) 60 which is arranged on the projection lens 31 side and can move in X direction, the Y base 50 and the X base 60 being stacked. The Y base 50 is driven in Y direction by an Y-axis actuator 51 attached to a side face of the common base 4, and the X base 60 is driven in X direction by an X-axis actuator 61 attached to a side face of the Y base 50.

In the movable base assembly 33, two Y shafts 52 are provided as guide members for making the Y base 50 slide in Y direction, which are a feature of the present invention. These Y shafts 52 are fixed to shaft attaching portions 521 on both side faces of the fixing frame 41 of the common base 4 with retaining metal fittings 522, thereby the movable base assembly 33 is attached to the common base 4. The fixing frame 41 is provided with a potentiometer 58 which can detect a moving position of the Y base 50 and an end sensor 59 which can detect a moving end point. Similarly, for detecting a moving position and a moving end point of the X base 60, the Y base 60 is also provided with a potentiometer 68 and an end sensor 69 (see FIG. 8).

The base cover 34 is arranged in front of the movable base assembly 33 and is attached to a cover attaching portion 90 of the common base 4. When the base cover 34 is attached, a biasing force toward Z direction is applied to the movable base assembly 33, i.e., a force which presses the movable base assembly 33 against the common base 4 is applied, by means of a leaf spring 91 provided in the base cover 34, so that rattling of the position in Z direction of the projection lens 31 is eliminated.

Figure 7:
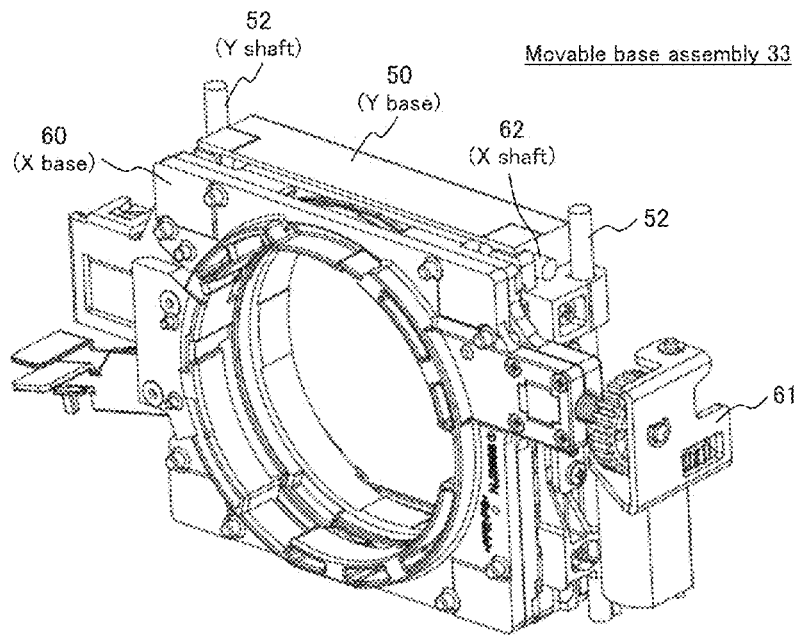
FIG. 7 is an entire view of a movable base assembly 33.
Figure 8:
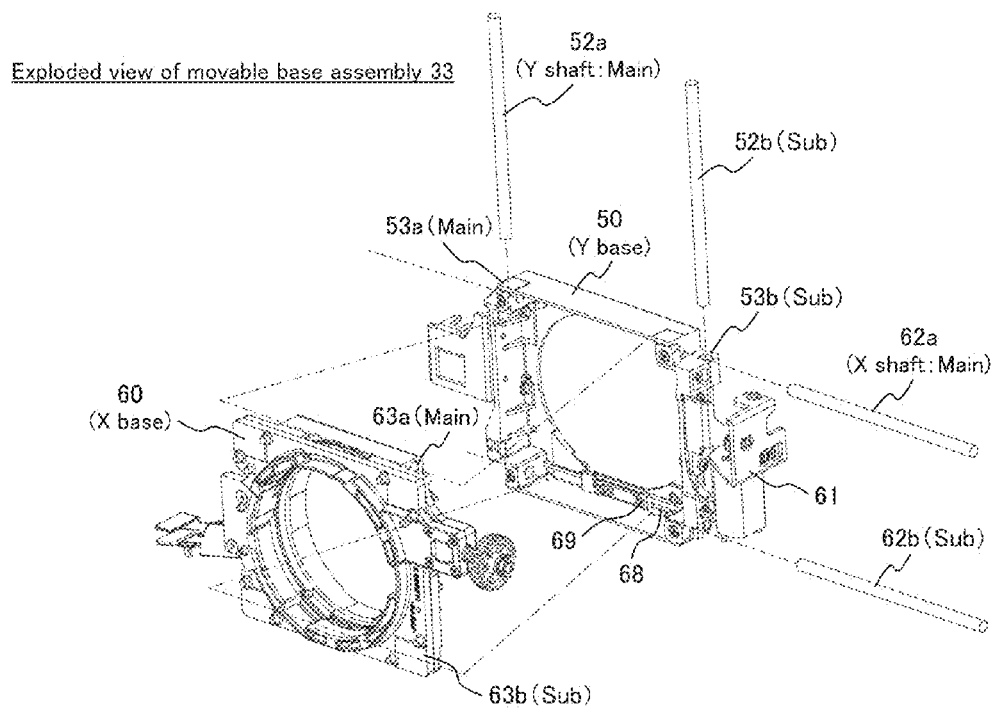
FIG. 8 is an exploded view of the movable base assembly 33.

FIG. 7 and FIG. 8 show the movable base assembly 33 and an exploded view thereof. FIG. 7 is an entire view of the movable base assembly 33, and FIG. 8 shows a state in which the movable base assembly 33 is exploded into the Y base 50 and the X base 60. The Y base 50 is driven in Y direction by the Y-axis actuator 51 attached to the common base 4, while the X base 60 is driven in X direction by the X-axis actuator 61 attached to the Y base 50. Moreover, cylindrical shafts are employed as guide members for sliding of the respective movable bases 50 and 60, thereby a sliding load is reduced as compared with a conventional surface-contact sliding and the positioning accuracy (linearity) of each of the movable bases 50 and 60 is improved.

The Y base 50 slides in Y direction by using two Y shafts 52 attached to the common base 4 as guide members. In both side faces of the Y base 50, two shaft holes 53, through which the Y shafts 52 are arranged to extend, are provided, respectively, for sliding. One of the two Y shafts 52 which is closer to the Y-axis actuator 51 (main shaft) is shown with reference sign 52a, and the other farther one (sub shaft) is shown with reference sign 52b. The shaft holes corresponding thereto are shown with reference signs 53a and 53b, respectively. The shaft hole 53a for main shaft has a perfectly circular shape having approximately the same diameter as the Y shaft 52a, and the shaft hole 53b for sub shaft has an elliptical shape larger than the diameter of the Y shaft 52b, so that slight rattling (play) is provided between the shaft hole 53b and the Y shaft 52b. Thus, even when an attached distance between the two Y shafts 52 is not perfectly coincide with a distance between the two shaft holes 53 formed in the Y base 50, an error between them can be absorbed and the Y base 50 can be made to smoothly slide with a low load. Moreover, because sliding with no rattling is achieved on the main shaft side which receives a driving force from the Y-axis actuator 51, the positional accuracy (linearity) of the Y base 50 during sliding can be maintained.

On the other hand, the X base 60 slide in X direction by using two X shafts 62 arranged along a top side and a bottom side of the Y base 50 as guide members. At the top and bottom sides of the X base 60, two shaft holes 63 for allowing the X shafts 62 to extend therethrough for sliding are provided. One of the two X shafts 62 which is closer to the X-axis actuator 61 (main shaft) is shown with reference sign 62a, the other farther one (sub shaft) is shown with reference sign 62b, and the shaft holes corresponding thereto are shown with reference signs 63a and 63b, respectively. Similarly to the case of the aforementioned Y base 50, the shaft hole 63a for main shaft is formed to be a perfect circle corresponding to the diameter of the X shaft 62a, and the shaft hole 63b for sub shaft is formed to be an elliptical shape larger than the diameter of the X shaft 62b to provide slight rattling between the shaft hole 63b and the X shaft 62b. Due to this, the X base 60 can be made to slide smoothly with respect to the Y base 50, and the positioning accuracy (linearity) of the X base 60 when sliding can be maintained. For detecting a moving position and a moving end point of the X base 60, a potentiometer 68 and an end sensor 69 are provided in the Y base 50.

Figure 9:
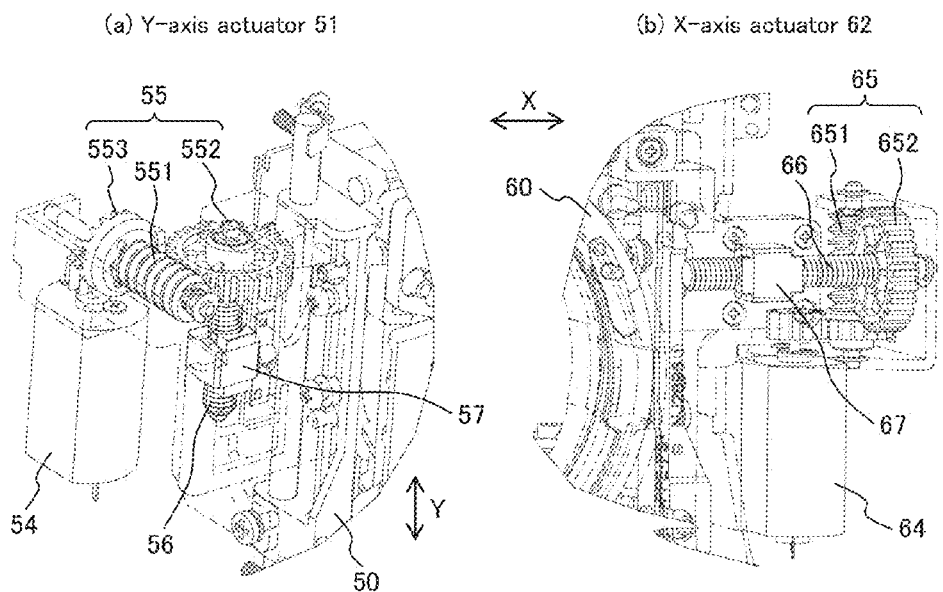
FIG. 9 is a diagram showing a power transmission structure of actuators 51 and 61.
Figure 10:
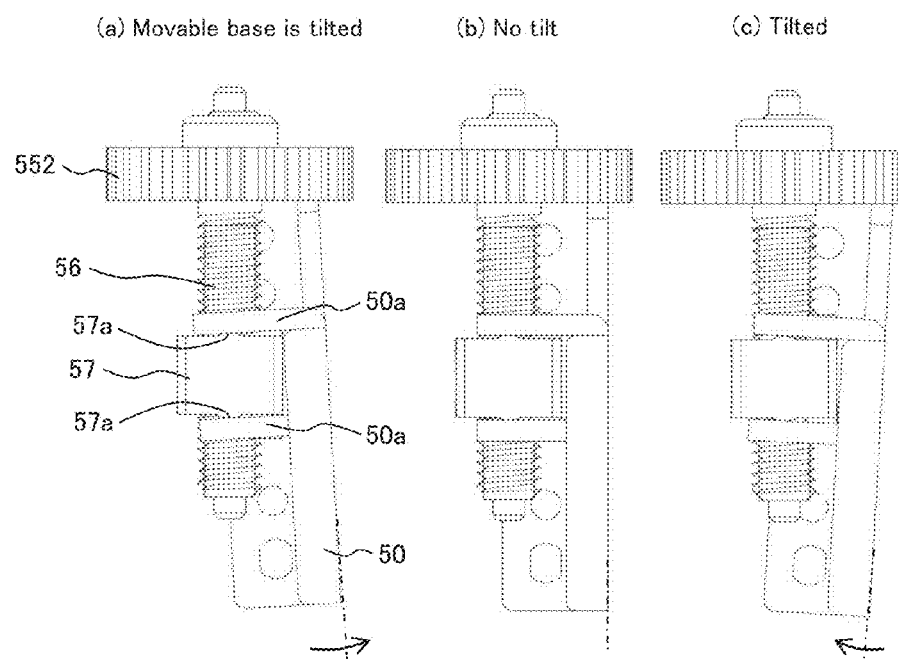
FIG. 10 is a diagram showing power transmission to a movable base.

FIG. 9 and FIG. 10 show a power transmission structure of the actuators. FIG. 9 show entire views of the actuators, and FIG. 10 show power transmission to the movable base.

In FIG. 9, (a) shows the Y-axis actuator 51 and (b) shows the X-axis actuator 61. Each of the Y-axis actuator 51 and the X-axis actuator 61 reduces a rotational force of an electric motor 54, 64 with a gear train 55, 65 to transmit the reduced rotational force to a lead screw 56, 66, thereby propelling a non-rotating drive nut 57, 67 which meshes with the lead screw. To the drive nuts 57 and 67, the Y base 50 and the X base 60 are connected, respectively, and the Y base 50 and the X base 60 move in Y direction and X direction. Two electric motors 54 and 64 are arranged on both side faces of the lens shifting mechanism 32, respectively, with rotation axes thereof arranged along Y direction for reducing the outer sizes thereof. In the gear train 55 or 65, rotation is reduced by using a worm gear 551 or 651 and a worm wheel 552 or 652, and backlash during movement is eliminated. Moreover, a crown gear 553 is added in the Y-axis gear train 55 for changing a direction of the rotation axis by 90 degrees. Since the sliding load when the movable base 50 or 60 is moved is reduced in this example as described before, a driving power required for the electric motors 54 and 64 is reduced and a small sized motor can be used.

FIG. 10 shows the lead screw and the drive nut which perform power transmission to the movable base. Although the lead screw 56 and the drive nut 57 for driving the Y base 50 are shown in this drawing, the lead screw 66 and the drive nut 67 for driving the X base 60 are the same if FIG. 10 is rotated by 90 degrees. In FIG. 10, operations in a case where the side-face direction of the Y base 50 is tilted with respect to the axial direction of the lead screw 56 are shown in (a), (b), and (c) while being compared with one another.

First, an operation common to (a) to (c) is described. When the worm wheel 553 rotates, the lead screw 56 which is concentric therewith also rotates and propels the drive nut 57 meshing with the lead screw 56 in Y direction. On the other hand, the Y base 50 is provided with connecting pieces 50a which sandwich the drive nut 57 therebetween from both end faces of the drive nut 57 in Y direction (connecting faces). The drive nut 57 pushes the connecting pieces 50a to move by moving in Y direction, thereby moving the Y base 50 in Y direction. On the connecting face of the drive nut 57, a protrusion 57a is formed in a central portion so that the drive nut 57 comes into contact with the connecting piece 50a on the Y base 50 side at this protrusion 57a but does not come into contact at other portions than the protrusion 57. This protrusion 57a is used for stably moving the Y base 50 even if the posture (the side-face direction) of the Y base 50 is tilted, and how to move the Y base 50 is described below.

FIG. 10(b) shows a case where the axial direction of the lead screw 56 and the side-face direction of the Y base 50 are parallel to each other. In this case, the connecting faces of the drive nut 57 and the connecting pieces 50a of the Y base 50 are parallel to each other, and therefore the Y base 50 can smoothly move without the protrusion 57a. On the other hand, FIGS. 10(a) and (c) show cases where the side-face direction of the Y base 50 is tilted with respect to the axial direction of the lead screw 56 in a direction shown with arrow. In those cases, although the connecting pieces 50a of the Y base 50 are tilted together, the posture of the drive nut 57 is regulated by the lead screw 56 and cannot be tilted. Thus, the connecting face of the drive nut 57 and the connecting pieces 50a are not parallel to each other. If the connecting face of the drive nut 57 is flat, contact with the engaging portion 50a is unstable (because an edge portion comes into contact), so that the sliding load becomes larger and smooth moving of the Y base 50 becomes difficult. Thus, the protrusion 57a is formed on the connecting face of the drive nut 57, thereby always making this protrusion 57a in contact with the opposed connecting piece 50a, stabilizing the contact therebetween irrespective of the posture of the Y base 50, and enabling smooth moving of the Y base 50.

Figure 11:
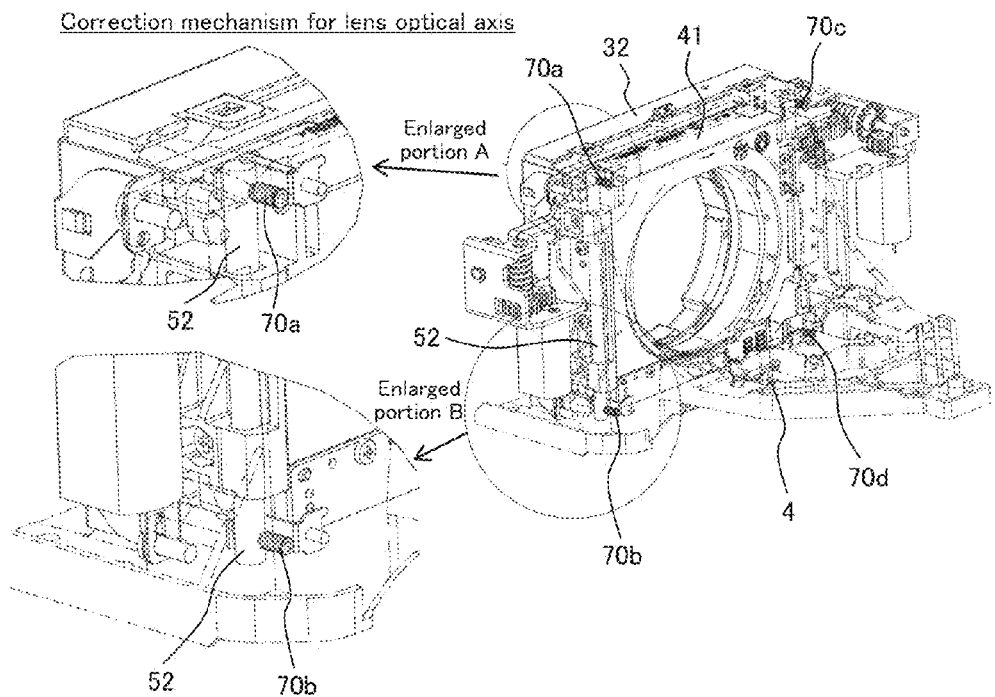
FIG. 11 is a diagram showing an optical axis correction mechanism for a projection lens.
Figure 12:
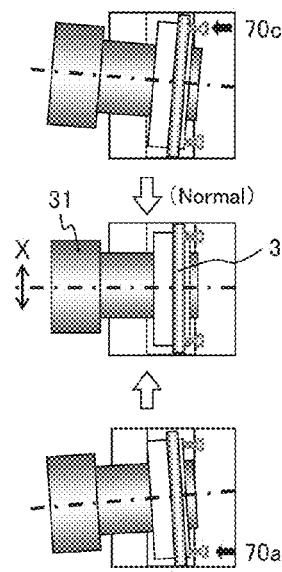
FIG. 12 is a diagram explaining an operation for correcting an optical axis of the projection lens.
Figure 12:
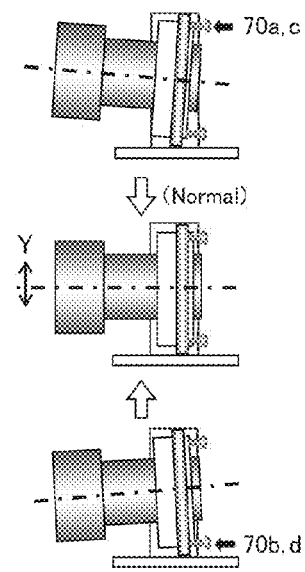
Figure 12:
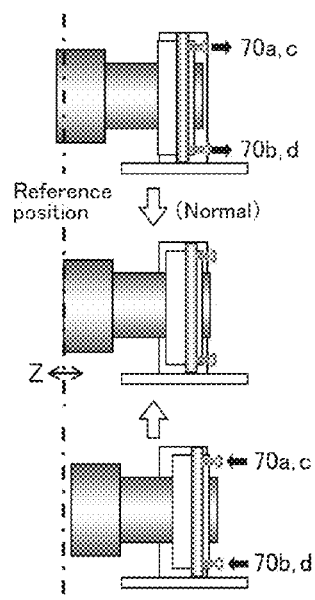

FIG. 11 and FIG. 12 show correction of the optical axis of the projection lens. FIG. 11 is a diagram explaining a correction mechanism, and FIG. 12 is a diagram explaining a correction operation. In optical axis correction, two types of correction, i.e., tilt correction for a lens optical axis and lens position correction in the direction of the optical axis (Z direction) are performed. The former correction, i.e., tilt correction corrects tilt generated by accumulated tolerances after the shifting mechanism is assembled, for suppressing focus imbalance. The latter one, i.e., lens position correction corrects a displacement of the lens position in the direction of the optical axis which is generated by accumulated tolerances after the shifting mechanism is assembled, for making a distance from an image forming surface (a liquid crystal panel surface) to a rear edge of the lens (back focus) appropriate.

FIG. 11 is a view of the common base 4 with the lens shifting mechanism 32 mounted thereon, when seen from the rear side (the side on which the optical engine 2 is mounted). At four corners of the fixing frame 41 of the common base 4, four correction screws 70a to 70d for optical axis correction are inserted from the rear side. Enlarged views A and B show portions in which the correction screws 70a and 70b are attached and surrounding portions thereof, respectively. The position at which the correction screw is attached is set to correspond to positions of top and bottom ends of the Y shaft 52 which is the guide member of the lens shifting mechanism 32. The Y shaft 52 is pressed toward the fixing frame 41 by receiving the biasing force in Z direction from the leaf spring 91 provided in the base cover 34. The correction screw 70 is pushed into the Y shaft 52 or is pulled back with the Y shaft 52, thereby the upper end side or the lower end side of the Y shaft 52 which is in contact with the correction screw 70 can be displaced in a projection direction (Z direction). Adjusting the insertion amounts of four correction screws 70a to 70d can change the tilt or the displacement amount of two Y shafts 52, so that the tilt and the position of the lens shifting mechanism 32, i.e., the tilt of the optical axis and the lens position of the projection lens 31 attached to the lens shifting mechanism 32 can be corrected. In this manner, correction of the lens optical axis can be achieved in this example by a simple structure in which the Y shafts 52 introduced as the guide members for the lens shifting mechanism 32 are used and pushed in by means of the correction screws 70.

FIG. 12 shows a specific example of the correction operation. (a) is a lens top view showing an example of tilt correction in the horizontal direction, in which the optical axis (Z-axis) of the projection lens 31 is tilted with respect to a normal state in the horizontal direction (X-axis). In this case, with respect to the lens shifting mechanism 32, the correction screws 70c and 70d on the right end side or the correction screws 70a and 70b on the left end side are pushed in, thereby the direction of the optical axis is corrected to the normal state. (b) is a lens side view showing an example of tilt correction in the vertical direction, in which the lens optical axis (Z-axis) is tilted with respect to the normal state in the vertical direction (Y direction). In this case, the correction screws 70a and 70c on the upper end side or the correction screws 70a and 70b on the lower end side are pushed in, thereby correction to the normal state is achieved. (c) is a lens side view showing an example of lens position correction, in which the lens position of the projection lens 31 is displaced from a reference position in the direction of the optical axis (Z direction). In this case, four correction screws 70a to 70d are pushed in or pulled back, thereby the lens position is corrected to a normal position.

In a case where the lens optical axis is tilted in both the horizontal direction and the vertical direction, it is sufficient to perform a combination of the operations of (a) and (b). Also, in a case where both the tilt of the lens optical axis and the displacement of the lens position occur, it is sufficient to perform a combination of the operations of (a) and (c) or (b) and (c).

Figure 13:
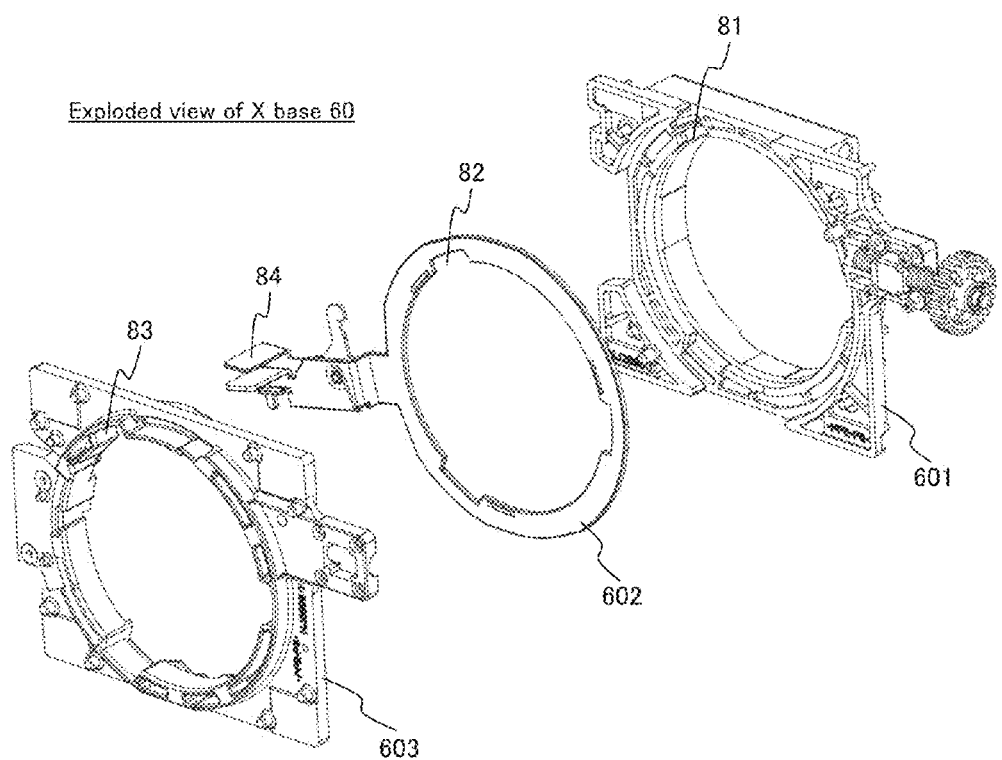
FIG. 13 is a diagram explaining how to attach and detach the projection lens.

FIG. 13 is a diagram explaining how to attach and detach the projection lens 31, and shows the X base 60 in FIG. 8 which has been further exploded. For holding the projection lens 31, the X base 60 can be divided into an X base main body 601, a pressing ring 602, and a lens holder 603. For holding the projection lens 31, the X base main body 601 is provided with the concave portions 81 (at three positions) with which the flanges 80 (see FIG. 4) provided on the lens barrel 311 of the projection lens 31 are engaged. Please note that the depth in Z direction of the concave portion 81 is set to be slightly smaller than the width in Z direction of the flange 80. In the pressure ring 602 and the lens holder 603, cutout portions 82 and 83 are provided (at three positions, respectively), each of which allows the corresponding flange 80 to pass therethrough when the projection lens 31 is attached or detached.

Moreover, a lever 84 for switching between locking and releasing of the held lens is provided in the pressing ring 602. When the projection lens 31 is attached, the pressing ring 602 is turned by the lever 84 so that a portion other than the cutout portion 82 presses the flange 80 engaged with the concave portion 81, thereby fixing the projection lens 31 to the X base 60. In a case of detaching the projection lens 31, the pressing ring 602 is turned by the lever 84 in an opposite direction to position the cutout portion 82 at the position of the concave portion 81 and release the pressing by the flange 80, thereby the projection lens 31 can be removed from the X base 60.

As described above, according to this example, a projection video display device can be provided which reduces a sliding load while maintaining adjustment accuracy in a lens shifting mechanism. Moreover, tilt of an optical axis of a projection lens and a displacement of a lens position thereof can be achieved by a simple structure.

REFERENCE SIGNS LIST

1 . . . case,
2 . . . optical engine,
21 . . . light source portion,
22 . . . color separation optical system
23 . . . color synthesis optical system,
3 . . . projection optical system,
31 . . . projection lens,
32 . . . lens shifting mechanism,
33 . . . movable base assembly,
34 . . . base cover,
4 . . . common base,
41 . . . fixing frame,
42, 43 . . . pedestal portion,
50 . . . Y-axis movable base (Y base),
50a . . . connecting piece,
51 . . . Y-axis actuator,
52 . . . Y shaft,
521 . . . shaft attaching portion,
522 . . . pressing metal fitting,
53, 63 . . . shaft hole,
54, 64 . . . electric motor,
55, 65 . . . gear train,
551, 651 . . . worm gear,
552, 652 . . . worm wheel,
553 . . . crown gear,
56, 66 . . . lead screw,
57, 67 . . . drive nut,
57a . . . protrusion,
58, 68 . . . potentiometer,
59, 69 . . . end sensor,
60 . . . X-axis movable base (X base),
601 . . . X base main body,
602 . . . pressing ring,
603 . . . lens holder,
61 . . . X-axis actuator,
62 . . . X shaft,
70a to 70d . . . correction screw,
80 . . . flange,
81 . . . convex portion,
84 . . . lever,
90 . . . cover attaching portion,
91 . . . leaf spring

The invention claimed is:

1. A projection video display device for enlarging and projecting a video formed by a display element with a projection lens, comprising
a lens shifting mechanism arranged to move the projection lens in two axial directions perpendicular to an optical axis of projection light,
wherein the lens shifting mechanism includes a first movable base for moving the projection lens in a vertical direction, a second movable base for moving the projection lens in a horizontal direction, a first actuator for driving the first movable base, and a second actuator for driving the second movable base, the first movable base is arranged to slide by using two shafts arranged in the vertical direction on a fixed member side as guide members, and the second movable base is arranged to slide by using two shafts arranged in the horizontal direction on the first movable base as guide members, and correction screws are inserted toward the two shafts as the guide members of the first movable base from a rear side of the fixed member to come into contact with the shafts, and insertion amounts of the correction screws are adjusted, thereby tilt of an optical axis of the projection lens and a position displacement of the projection lens are corrected.

2. The projection video display device according to claim 1, wherein each of the first and second movable bases is provided with two shaft holes allowing the shafts to extend therethrough, and one of the two shaft holes which is closer to a corresponding one of the first and second actuators has approximately the same diameter as the shafts while another one is larger than the diameter of the shafts.

3. The projection video display device according to claim 1, wherein each of the first and second actuators is arranged to propel a drive nut by rotation of a lead screw provided therein to move a corresponding one of the first and second movable bases connected to the drive nut, for driving the corresponding movable base, and a protrusion is formed on a connecting face of the drive nut.

* * * * *